US008806425B1

(12) United States Patent
Willis et al.

(10) Patent No.: US 8,806,425 B1
(45) Date of Patent: Aug. 12, 2014

(54) METHOD AND APPARATUS FOR GENERATING INFRASTRUCTURE CODE

(75) Inventors: Raymond Walter Willis, Seattle, WA (US); John M. Anderson, Auburn, WA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 13/481,266

(22) Filed: May 25, 2012

(51) Int. Cl.
*G06F 9/44* (2006.01)

(52) U.S. Cl.
USPC .............................. 717/104; 717/106; 717/116

(58) Field of Classification Search
None
See application file for complete search history.

(56) References Cited

U.S. PATENT DOCUMENTS

| | | | |
|---|---|---|---|
| 6,513,152 B1 * | 1/2003 | Branson et al. ............... | 717/116 |
| 7,080,352 B2 * | 7/2006 | Geisinger ..................... | 717/106 |
| 7,823,123 B2 * | 10/2010 | Sabbouh ....................... | 717/106 |
| 7,926,029 B1 * | 4/2011 | Stoyen et al. ................. | 717/116 |
| 7,954,084 B2 * | 5/2011 | Arcaro et al. ................. | 717/116 |
| 8,402,034 B2 * | 3/2013 | McCloskey et al. .......... | 707/748 |
| 8,645,904 B2 * | 2/2014 | Coldicott et al. ............. | 717/104 |
| 2002/0083071 A1 * | 6/2002 | Crapo et al. .................. | 707/102 |
| 2003/0172368 A1 * | 9/2003 | Alumbaugh et al. ......... | 717/106 |
| 2004/0034848 A1 * | 2/2004 | Moore et al. .................. | 717/104 |
| 2006/0206883 A1 * | 9/2006 | Sabbouh ....................... | 717/146 |
| 2007/0240128 A1 * | 10/2007 | Patton et al. .................. | 717/106 |
| 2008/0021700 A1 * | 1/2008 | Moitra et al. ..................... | 704/9 |
| 2008/0052667 A1 * | 2/2008 | Taitel ........................... | 717/106 |
| 2008/0059945 A1 * | 3/2008 | Sauer et al. ................... | 717/104 |
| 2008/0263506 A1 * | 10/2008 | Broadfoot et al. ............ | 717/104 |
| 2009/0320093 A1 * | 12/2009 | Glazier et al. ................ | 717/106 |
| 2010/0070450 A1 * | 3/2010 | Barker ............................ | 706/48 |
| 2010/0083213 A1 * | 4/2010 | Chouinard et al. ........... | 717/104 |
| 2010/0094805 A1 * | 4/2010 | Ingerman et al. ............. | 717/104 |
| 2010/0131916 A1 * | 5/2010 | Prigge ........................... | 717/104 |
| 2010/0199257 A1 * | 8/2010 | Biggerstaff ................... | 717/116 |
| 2012/0042300 A1 * | 2/2012 | Taitel ............................ | 717/106 |
| 2012/0278788 A1 * | 11/2012 | Crapo ........................... | 717/106 |
| 2013/0019224 A1 * | 1/2013 | Madl et al. .................... | 717/104 |
| 2013/0117727 A1 * | 5/2013 | Broadfoot et al. ............ | 717/104 |

OTHER PUBLICATIONS

Hupf et al., Generative Gateway Toolkit for Heterogeneous C3I Systems, 2006 IEEE, pp. 1-7; <http://ieeexplore.ieee.org/stamp/stamp.jsp?tp=&arnumber=4086525>.*

Kappel et al., "Towards a Semantic Infrastructure Supporting Model-based Tool Integration", 2006 ACM, GaMMa'06, May 22, 2006, Shanghai, China, pp. 1-4; <http://dl.acm.org/results.cfm?h=1&cfid=304794976&cftoken=79323359>.*

Serrano et al., "Ontology-based Reasoning for supporting context-aware services on autonomic networks", 2007 IEEE, pp. 2097-2102; <http://ieeexplore.ieee.org/stamp/stamp.jsp?tp=&arnumber=4289018>.*

(Continued)

*Primary Examiner* — Thuy Dao
*Assistant Examiner* — Ben C Wang
(74) *Attorney, Agent, or Firm* — Alston & Bird LLP

(57) ABSTRACT

A method, apparatus and computer program product are provided for generating infrastructure code. In the context of a method, an ontology representative of a semantic data model is received. The method then processes the ontology in accordance with configuration information that defines the portion of the ontology to process, mapping information that defines a relationship between type information in the semantic data model and data types in the infrastructure code and one or more rules from the semantic data model relating to a conversion between different versions of semantic data model. In response to the processing, the method also automatically generates the infrastructure code in each of a plurality of computer languages.

14 Claims, 3 Drawing Sheets

(56) References Cited

OTHER PUBLICATIONS

Michael A. Zang, "Ontological Approaches for Semantic Interoperability", 5th Annual ONR Workshop on Collaborative Decision-Support Systems, Sep. 10-11, 2003, pp. 1-10; <http://digitalcommons.calpoly.edu/cgi/viewcontent.cgi?article=1078...cadrc>.*

Kalyanpur, A. et al., *Automatic Mapping of OWL Ontologies into Java*, In F. Maurer & Gil. Ruhe (eds), *SEKE* (p.pp. 98-103, ISBN: 1-891706-14-4) (dated 2004) 8 pages.

Pastor, D. J. et al., *Towards Harmon1A; automatic generation of e-organisations from Intitution to specifications*, CEUR Workshop Proceedings, 2003, vol. 73, pp. 31-38 (dated 2004) 8 pages.

Converting XML to JavaBeans with XMLBeans |0 Java.net [online] [retrieved Jan. 2, 2014]. Retrieved from the Internet: URL: http://javaboutique.internet.com/reviews/xml_javabeans/>. (dated at least as early as 2010) 1 page.

JSave—Protege Wiki (Using JSave to generate class definition Stubs for Protégé Fame Classes) [online] [retrieved Jan. 2, 2014]. Retrieved from the Internet: URL: <http://protegewiki.stanford.edu/wiki/JSave>. (dated 2008) 9 pages.

Rhizomik (A tool for converting XML schema into OWL) [online] [retrieved Jan. 2, 2014]. Retrieved from the Internet: URL: http://rhizomik.net/html/redefer/>. (dated at least as early as 2010) 13 pages.

* cited by examiner

METHOD AND APPARATUS FOR GENERATING INFRASTRUCTURE CODE

TECHNOLOGICAL FIELD

Embodiments of the present disclosure relate generally to methods and apparatus for generating infrastructure code and, more particularly, to methods and apparatus for automatically generating infrastructure code in each of a plurality of computer languages.

BACKGROUND

Semantic data models are utilized for a variety of purposes. A semantic data model formally describes, in a machine readable format, the structure and meaning of, and the rules for using, the information described by the data model. Based upon the semantic data model, software code, generally referenced as infrastructure code, may be generated. The infrastructure code may, in turn, be utilized to transmit the information described by the semantic data model across a variety of communication infrastructures. As such, the infrastructure code may be messaging system interface code. Additionally or alternatively, the infrastructure code may be utilized to persist and retrieve the information from a variety of data persistence infrastructures. In this instance, the infrastructure code may be database interface code. The computer language in which the infrastructure code is generated is generally dependent upon the computer language utilized for the communication infrastructure and/or the data persistence infrastructure.

Semantic data models may change over time. Semantic data models may change for various reasons including as a result of product development or of a change in a published standard with which the semantic data model is to comply. In an instance in which the semantic data model changes, the infrastructure code that is generated based upon the semantic data model must also be modified to take into account the changes to the semantic data model. The extent of the change to the semantic data model combined with the number of users of the semantic data model has a direct impact upon the amount of the infrastructure code that must be modified and retested. The modification and the retesting of the infrastructure code that is generated based upon the semantic data model are currently performed at least partially manually and generally create a substantial expense in terms of man hours, additional compute resources, etc.

By way of example, one semantic data model may be specified in OWL (Web Ontology Language), an extensible markup language (XML)-based language. Utilizing the Protégé graphical program, OWL-based ontological models may be created, read and modified. Based upon the resulting ontological model, rudimentary Java Bean infrastructure code may be generated, but database interface code, messaging system interface code or code in any other computer language is not generally generated by the Protégé graphical program. Instead, the software code that is generated based upon the ontological model is typically tied to a specific technology and/or a specific computer language. For example, in a system in which a data distribution system (DDS) has been chosen for messaging and a relation database system has been chosen for data storage, interface definition language (IDL) code may be manually created and a tool may then be utilized to generate the communication infrastructure software, such as in Java and C++, that interacts with the messaging system. Likewise, a tool may be utilized to generate the infrastructure code in a specific computer language that interacts with the database system. However, a change in the computer language, such as a result of a change in the communication infrastructure, the data persistence infrastructure or otherwise, may require the infrastructure code to be regenerated in a different computer language, often at substantial cost in terms of time and expense because a tool to generate in the different computer language may not be available.

BRIEF SUMMARY

A method, apparatus and computer program product are therefore provided in accordance with embodiments of the present disclosure in order to automatically generate infrastructure code in each of a plurality of computer languages. The infrastructure code may be messaging system interface code to facilitate the transmission of information described by the semantic data model and/or to database interface code to cause the information described by the semantic data model to persist within a data persistence infrastructure and to be retrieved from the data persistence infrastructure. By automatically generating the infrastructure code in each of a plurality of computer languages, the method, apparatus and computer program product provide flexibility in regards to the communication infrastructure and/or data persistence infrastructure that may interact with the information described by a semantic data model since the communication infrastructure and/or the data persistence infrastructure may utilize any of the multiplicity of computer languages for which infrastructure code is automatically generated without having to take the time and expense required to generate and test additional infrastructure code.

In one embodiment, a method is provided for generating infrastructure code. The method includes receiving an ontology representative of a semantic data model. The method then processes the ontology in accordance with configuration information that defines the portion of the ontology to process, mapping information that defines a relationship between type information in the semantic data model and data types in the infrastructure code and one or more rules from the semantic data model relating to a conversion between different versions of semantic data model. In response to the processing, the method also automatically generates the infrastructure code in each of a plurality of computer languages. In processing the ontology, the method may create a representation of language neutral classes within the semantic data model. In this regard, the method may automatically generate infrastructure code by converting the language neutral classes to language specific classes for each of the plurality of computer languages for which infrastructure code is generated.

In another embodiment, a system for generating infrastructure code is provided that includes a semantic driven development (SDD) generator configured to receive an ontology representative of a semantic data model. The SDD generator is also configured to process the ontology in accordance with configuration information that defines the portion of the ontology to process, mapping information that defines a relationship between type information in the semantic data model and data types in the infrastructure code and one or more rules from the semantic data model relating to conversion between different versions of semantic data model. The SDD generator is further configured to automatically generate the infrastructure code in each of a plurality of computer languages in response to the processing. The system also includes a memory configured to store the infrastructure code generated in each of the plurality of computer languages.

The SDD generator may be configured to process the ontology by creating a representation of language neutral classes within the semantic data model. In this regard, the SDD generator may be configured to automatically generate the infrastructure code by converting the language neutral classes to language specific classes for each of the plurality of computer languages for which infrastructure code is generated.

In a further embodiment, a computer program product is provided for generating infrastructure code. The computer program product may include a non-transitory computer-readable storage medium having computer-readable program code portions stored therein that in response to execution by a processor cause an apparatus to receive an ontology representative of a semantic data model. The computer-readable program code portions may also process the ontology in accordance with configuration information that defines the portion of the ontology to process, mapping information that defines a relationship between type information in the semantic data model and data types in the infrastructure code and one or more rules from the semantic data model relating to conversion between different versions of semantic data model. In response to the processing, the computer-readable program code portions automatically generate the infrastructure code in each of a plurality of computer languages.

The computer-readable program code portions that process what the ontology comprises may be configured to create a representation of language neutral classes within the semantic data model. In this regard, the computer-readable program code portions may be configured to automatically generate the infrastructure code by converting the language neutral classes to language specific classes for each of the plurality of computer languages for which infrastructure code is generated.

In each of the foregoing embodiments, the infrastructure code may be configured to facilitate transmission of the information described by the sematic data model via a communication infrastructure utilizing a respective computer language. The infrastructure code may therefore be configured to interact with a messaging system utilizing the respective computer language. The infrastructure code may also or alternatively be configured to cause the information described by the semantic data model to persist within a data persistence infrastructure and to be retrieved from the data persistence infrastructure utilizing a respective computer language. Thus, the infrastructure code may be configured to interact with a database system utilizing the respective computer language.

BRIEF DESCRIPTION OF THE DRAWINGS

Figure 1:
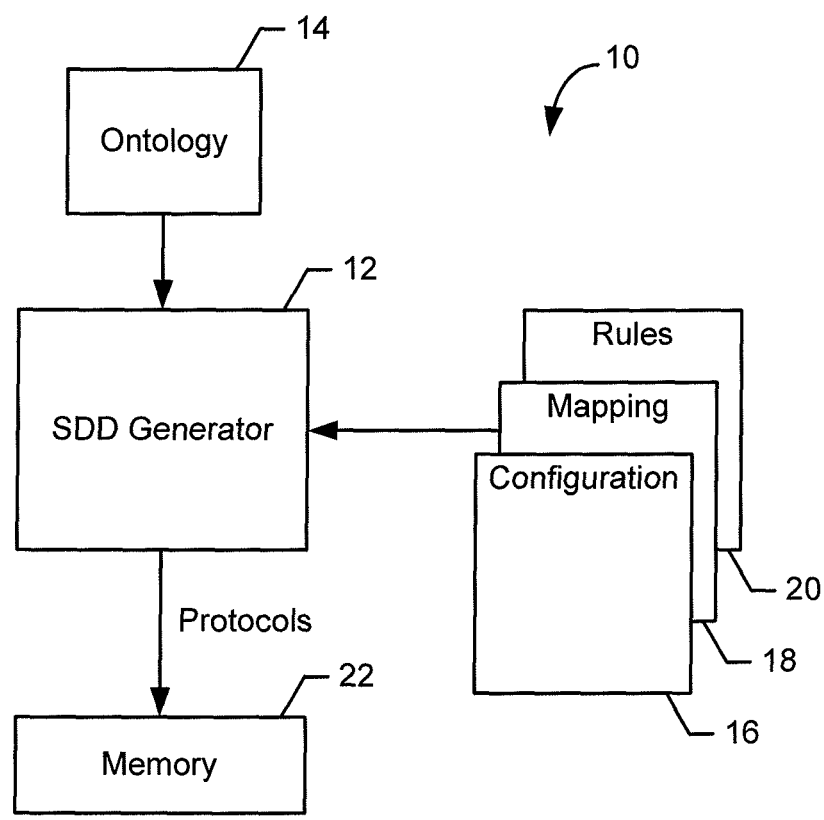
Figure 2:
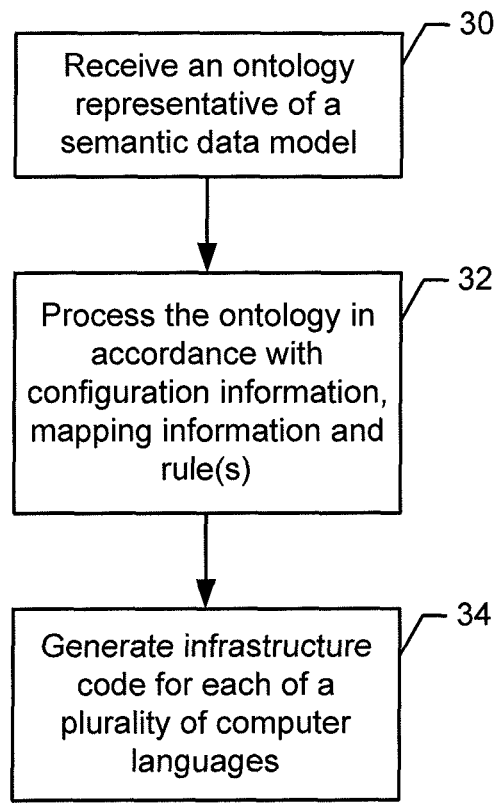
Figure 3:
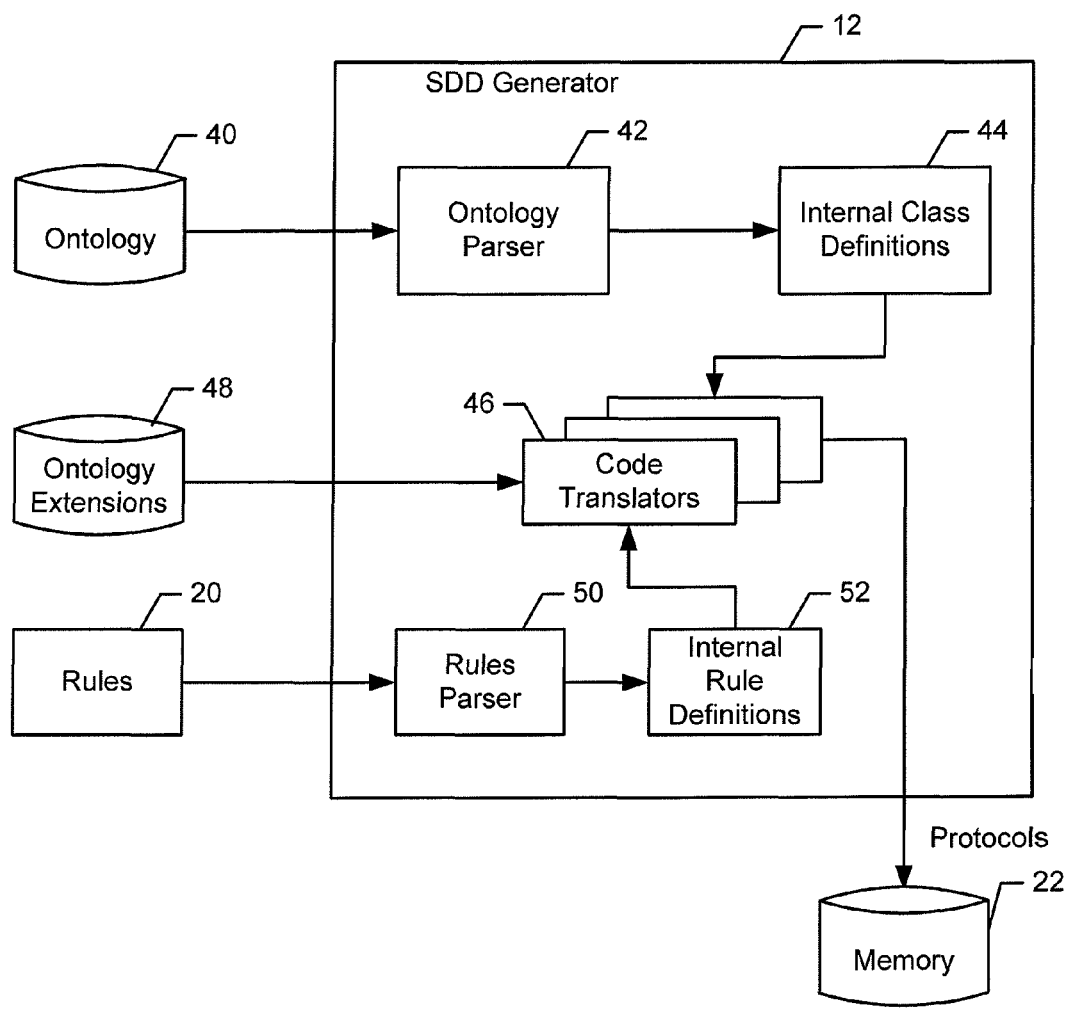

Having thus described certain embodiments of the invention in general terms, reference will now be made to the accompanying drawings, which are not necessarily drawn to scale, and wherein:

FIG. 1 is a block diagram of a system for generating infrastructure code in accordance with an example embodiment of the present disclosure;

FIG. 2 is a flowchart illustrating operations performed in accordance with an example embodiment of the present disclosure; and FIG. 3 is a block diagram of a semantic driven development (SDD) generator in accordance with an example embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a system 10 for generating infrastructure code based upon a semantic data model is depicted. The infrastructure code that is generated may be utilized for various purposes including as messaging system interface code to facilitate transmission of information described by the semantic data model via a communication infrastructure, such as a messaging system, and/or as database interface code to cause information described by the semantic data model to persist within and to be retrieved from a data persistence infrastructure, such as a database system. The system 10 for generating infrastructure code includes an SDD generator 12 that receives the semantic data model, such as by receiving an ontology 14 representative of the semantic data model, and that automatically generates the infrastructure code based thereupon in each of a plurality of computer languages. As used herein, the automatic generation of code refers to the generation of code by the execution of a software program that embodies an embodiment of the present disclosure, as described hereinafter. Thus, the system 10 may also include a memory 16 for storing the infrastructure code, also referred to as protocols, in each of the plurality of computer languages.

The SDD generator 12 may be configured in various manners, but, in one embodiment, is embodied by a computing device which may optionally include, for example, one or more processors, memory devices, Input/Output (I/O) interfaces, communications interfaces and/or user interfaces. The processor may include, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be specifically configured to operate such that the processor causes the SDD generator 12 to perform various functionalities described herein.

Whether configured as hardware alone or via instructions stored on a computer-readable storage medium, or by a combination thereof, the processor may be an apparatus embodying or otherwise configured to perform operations of the SDD generator 12 according to embodiments of the present disclosure while accordingly configured. Thus, in example embodiments where the processor is embodied as, or is part of, an ASIC, FPGA, or the like, the SDD generator 12 is specifically configured hardware for conducting the operations described herein. Alternatively, in example embodiments where the processor is embodied as an executor of instructions stored on a computer-readable storage medium, the instructions specifically configure the SDD generator 12 to perform the algorithms and operations described herein.

The memory device of the computing device may be one or more non-transitory computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor of the computing device.

Further, the memory device of the computing device may be configured to store information, data, applications, computer-readable program code instructions, and/or the like for enabling the SDD generator 12 to carry out various functions in accordance with example embodiments of the present disclosure described herein. For example, the memory device may be configured to buffer input data for processor. Additionally, or alternatively, the memory device may be configured to store instructions for execution by the processor.

The I/O interface of the computing device may be any device, circuitry, or means embodied in hardware, software or a combination of hardware and software that is configured to interface the processor with other circuitry or devices, such as the communications interface and/or the user interface of the computing device. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the SDD generator 12 to perform, various functionalities of an example embodiment of the present disclosure.

The communication interface of the computing device may be any device or means embodied in hardware, software or a combination of hardware and software that is configured to receive and/or transmit data from/to one or more networks and/or any other device in communication with the SDD generator 12. The communications interface may be configured to provide for communications in accordance with any of a number of wired or wireless communication standards. The processor of the computing device may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications.

The user interface of the computing device may be in communication with the processor to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. In some example embodiments, the user interface circuitry is configured to facilitate user control of at least some functions of the computing device through the use of a display and configured to respond to user inputs. The processor may also comprise, or be in communication with, display circuitry configured to display at least a portion of a user interface, the display and the display circuitry configured to facilitate user control of at least some functions of the SDD generator 12.

As shown in FIG. 1, the system 10 also includes memory 14 for storing the infrastructure code that is generated as described herein. The memory 14 may be internal to the SDD generator 12 and, as such, may be embodied by the memory device described above. Alternatively, the memory 14 may be external to and in communication with the SDD generator 12 as shown in FIG. 1. In this embodiment, the memory 14 may be one or more non-transitory computer-readable storage media that may include volatile and/or non-volatile memory. In some example embodiments, the memory 14 includes Random Access Memory (RAM) including dynamic and/or static RAM, on-chip or off-chip cache memory, and/or the like. Further, the memory 14 may include non-volatile memory, which may be embedded and/or removable, and may include, for example, flash memory, magnetic storage devices (e.g., hard disks, floppy disk drives, magnetic tape, etc.), optical disc drives and/or media, non-volatile random access memory (NVRAM), and/or the like.

The SDD generator 12 receives the semantic data model, such as in the form of an ontology 14. The semantic data model may be created in various manners, such as with a text editor. In one embodiment, however, the semantic data model is created utilizing a graphical program, such as the Protégé graphical program, that permits an OWL-based ontological model to be created, read and modified in a manner that maintains the internal coherency of the markup that describes the model. OWL is a set of markup languages which are designed for use by applications that process the content of information represented by a semantic data model, instead of just presenting information to a user. OWL ontologies describe the hierarchical organization of ideas in a domain, in a way that can be parsed and understood by software. One example of a semantic data model, and, more particularly, an OWL-based ontological model, is set forth below:

```
<?xml version="1.0"?>
<rdf:RDF
    . . .
xml:base="http://www.pw.boeing.com/Track.owl">
<owl:Ontology rdf:about=" "/>
<owl:Class rdf:ID="Track"/>
<owl:DatatypeProperty rdf:ID="latitude">
    <rdfs:comment rdf: datatype="http://www.w3.org/2001/
XMLSchema#string"
    >The latitude ranges from −90.0 to +90.0. </rdfs:comment>
    <rdfs:domain rdf:resource="#Track"/>
    <rdfs:range       rdfiresource="http://www.w3.org/2001/
XMLSchemagloat"/>
</owl:DatatypeProperty>
<owl:DatatypeProperty rdf:ID="altitude">
    <rdfs:doman rdf:resource="#Track"/>
    <rdfs:range       rdf:resource="http://www.w3.org/2001/
XMLSchema#float"/>
```

```
    <rdfs:comment rdf:datatype="http://www.w3.org/2001/
XMLSchema#string"
    >Altitude is the distance above sea level. </rdfs:comment>
</owl:DatatypeProperty>
<owl:DatatypeProperty rdf:ID="longitude">
    <rdfs:comment rdf:datatype="http://www.w3.org/2011/
XMLSchema#string"
    >Longitude ranges from −180.0 to +180.0. </rdfs:com-
ment>
    <rdfs:doman rdf:resource="#Track"/>
    <rdfs:range rdfresource="http://www.w3.org/2001/
XMLSchema#float"/>
</owl:DatatypeProperty>
</rdf: RDF>
```

While the semantic data model provided above is one example, other types of semantic data models may be provided to and ingested by the SDD generator 12 in other embodiments.

With reference now to FIG. 2, the operations performed by the SDD generator 12 of one embodiment are depicted. As shown, the SDD generator 12 initially receives an ontology 14 representative of a semantic data model as shown in block 30. Thereafter, the SDD generator 12 is configured to process the ontology 14 in accordance with the configuration information 16, mapping information 18, and one or more rules 20. See block 32 of FIG. 2. In this regard, the configuration information 16 defines the portion of the ontology to process and, consequently, the portion, if any, of the ontology not to process. As such, the configuration information provides guidance to the SDD generator 12 as to the manner in which the SDD generator should generate infrastructure code.

Configuration information 16 are source code templates that define the structure of the computer language source code that the SDD generator 12 generates. It establishes a relationship between constructs such as, for example, a Class, an Enumeration, or an Attribute, in the ontology 14 and the source code generated and saved in memory 22. There can be more than one configuration information 16 source. The number used depends on the computer language that is being generated. An embodiment of configuration information 16 used to generate a Java Class source file follows

```
// <<OWL.Class.Comment>>
package <<OWL.Class.User.PackageName>>
import java.io.Serializable;
<<OWL.Class.Import>>
public class <<OWL.Class>> implements Serializable,
<<OWL.Class>>IF {>>OWL.Class.Datatype>>
    public <<OWL.Class>> (){
    }
<<OWL.Class.Get>>
<<OWL.Class.Set>>
}
```

The templates contain specially delimited markers of the form <<OWL.xxxxxx>> that the SDD generator 12 uses during the code generation process, substituting relevant computer language for the special markers.

The mapping information 18 defines a relationship between type information in the semantic data model and data types in the infrastructure code. In this regard, the semantic data model that is received by the SDD generator 12 includes various types of information, such as types of data. Mapping information may be contained in a single XML file. That file embodies the entire sum of the knowledge the SDD generator 12 uses to map (translate) the language neutral datatypes into the types of the target computer language.

A translation (mapping) file contains information that tells the SDD generator 12 how to translate an OWL ontology into an object or representation in a different language such as Java, HTML, IDL, etc. For each language to be supported by the SDD generator 12, the translation file of one embodiment includes a Translation element that contains Template and Mapping elements. Each Translation element has a name and target language as attributes of the element. There is one translation section for each target language.

Template elements identify the name of a file that contains a template that is used by the SDD generator 12 during the code generation process. There can be more than one template for a language. For example, C plus plus code is made up of cpp and hpp files, so there may be a template file for each of these file types. Java code is made up of files that contain classes and files that contain interfaces, so there would be a template for each of those two kinds of files.

Mapping elements relate an OWL data type to a data type in the target language. Mapping elements of this embodiment have a OWLName and a LanguageName attribute. Many Mapping elements can be listed within a Translation section. As an example, if the target language is Java, it would make sense to map the OWL data type, "xsd:string", to the Java data type, "String".

An example of a translation file for purposes of illustration, but not of limitation, follows:

```
<!DOCTYPE RootElement SYSTEM "OwlTranslation.dtd">
<OWLTranslation>
<Translation Name="OWL2Java" Language="Java">
    <Template TemplateType="Class" FileName="OWL2JavaClass.java"/>
    <Template TemplateType="Interface" FileName="OWL2JavaInterface.java"/>
    <Template TemplateType="Enumeration" FileName="OWL2JavaEnumeration.java"/>
    <Template TemplateType="GwtService" FileName="OWL2JavaGwtServicejava"/>
    <Template TemplateType="GwtServiceAsync" FileName="OWL2JavaGwtServiceAsync.java"/>
    <Template TemplateType="GwtServiceImpl" FileName="OWL2JavaGwtServiceImpl.java"/>
    <Template TemplateType="GwtServiceDataReceiver" FileName="OWL2JavaGwtServiceDataReceiver.java"/>
    <Mapping OWLName="rdfs:Literal" LanguageName="String"/>
    <Mapping OWLName="xsd:string" LanguageName="String"/>
    <Mapping OWLName="xsd:float" LanguageName="float"/>
    <Mapping OWLName="xsd:double" LanguageName="double"/>
    <Mapping OWLName="xsd:int" LanguageName="int"/>
    <Mapping OWLName="xsd:boolean" LanguageName="boolean"/>
    <Mapping OWLName="xsd:date" LanguageName="Date"/>
    <Mapping OWLName="xsd:dateTime" LanguageName="DateTime"/>
    <Mapping OWLName="xsd:time" LanguageName="Time"/>
    <Mapping OWLName="owl:Thing" LanguageName="Thing"/>
</Translation>
<!--
<Translation Name="OWL2CSharp" Language="CSharp">
    <Template TemplateType="Class" FileName="OWL2CSharpClass.csc"/>
```

```
    <Template              TemplateType="Interface"
FileName="OWL2CSharpInterface.csc"/>
    <Mapping              OWLName="xsd:string"
LanguageName="string"/>
    <Mapping              OWLName="rdfs:Literal"
LanguageName="string"/>
    <Mapping              OWLName="xsd:float"
LanguageName="float"/>
    <Mapping OWLName="xsd:int" LanguageName="int"/>
    <Mapping              OWLName="xsd:boolean"
LanguageName="bool"/>
    <Mapping              OWLName="xsd:date"
LanguageName="Date"/>
    <Mapping              OWLName="xsd:dateTime"
LanguageName="DateTime"/>
    <Mapping              OWLName="xsd:time"
LanguageName="Time"/>
    <Mapping              OWLName="owl:Thing"
LanguageName="Thing"/>
</Translation>
-->
<Translation Name="OWL2HTML" Language="HTML">
    <Template              TemplateType="HTML"
FileName="OWL2HTML.html"/>
</Translation>
<Translation Name="OWL2IDL" Language="IDL">
    <Template              TemplateType="IDLModule"
FileName="OWL2IDL.idl"/>
    <Template              TemplateType="IDLStruct"
FileName="OWL2IDLStruct.idl"/>
    <Template              TemplateType="IDLEnum"
FileName="OWL2IDLEnum.idl"/>
    <Template              TemplateType="OpenDDSmpc"
FileName="OpenDDS.mpc"/>
    <Mapping              OWLName="xsd:string"
LanguageName="string"/>
    <Mapping              OWLName="xsd:float"
LanguageName="float"/>
    <Mapping              OWLName="xsd:double"
LanguageName="double"/>
    <Mapping              OWLName="xsd:int"
LanguageName="long"/>
    <Mapping              OWLName="xsd:boolean"
LanguageName="boolean"/>
    <Mapping              OWLName="xsd:date"
LanguageName="Date"/>
    <Mapping              OWLName="xsd:dateTime"
LanguageName="DateTime"/>
    <Mapping              OWLName="xsd:time"
LanguageName="Time"/>
    <Mapping              OWLName="owl:Thing"
LanguageName="Thing"/>
</Translation>
<Translation              Name="OWL2Hibernate"
Language="Hibernate">
    <Template              TemplateType="HibernateConfig"
FileName="hibernate.cfg.xml"/>
    <Template TemplateType="HibernateMapping"
FileName="OWL2Hibernate.hbm.xml"/>
    <Template              TemplateType="HibernateTest"
FileName="OWL2HibernateTest.java"/>
    <Template TemplateType="SchemaBuild"
FileName="OWL2HibernateSchemaBuild.xml"/>
    <Template TemplateType="HibernateInstructions"
FileName="OWL2HibernateInstructions.html"/>
    <Mapping  OWLName="xsd:string"  LanguageName=
"text"/>
    <Mapping              OWLName="xsd:float"
LanguageName="float"/>
    <Mapping              OWLName="xsd:int"
LanguageName="integer"/>
    <Mapping              OWLName="xsd:boolean"
LanguageName="boolean"/>
    <Mapping              OWLName="xsd:date"
LanguageName="Date"/>
    <Mapping              OWLName="xsd:dateTime"
LanguageName="DateTime"/>
    <Mapping              OWLName="xsd:time"
LanguageName="Time"/>
</Translation>
</OWLTranslation>
```

As such, the mapping information 18 correlates the types of information included within the semantic data model to the types of data to be included in the resulting infrastructure code.

In one embodiment, mapping information 18 exists as XML and uses standard XML tags and attributes. The SDD generator 12 understands the format of the mapping information 18 and acts according to the directives contained therein. As an example, an embodiment of a specific mapping directive that tells the SDD generator 12 to treat the OWL xsd: string and rdfs:Literal datatypes as a Java String datatype would appear in the Mapping information 18 as:

```
    <Mapping              OWLName="rdfs:Literal"
LanguageName="String" 7>
    <Mapping              OWLName="xsd:string"
LanguageName="String" I>
```

Because there are two OWL datatypes that should be treated as Java String, two directives are required.

Additionally, the rule(s) 20 permit the SDD generator 12 to utilize rules provided by the semantic data model in order to generate transformational software that converts between different versions of a semantic data model. Thus, in instances in which the semantic data model includes multiple versions, the semantic data model may include rules to define the manner in which infrastructure code generated for one version may be transformed or converted into infrastructure code for another version of the same semantic data model. The rules may be formulated in various manners, but, in one embodiment may be defined utilizing a semantic web rule language (SWRL).

As shown in block 34 of FIG. 2, the SDD generator 12 is also configured to automatically generate infrastructure code for each of a plurality of computer languages. In this regard, the SDD generator 12 is configured to automatically generate the infrastructure code in response to having processed the ontology 14 in accordance with the configuration information 16, mapping information 18, and one or more rules 20. The infrastructure code, also termed protocols, in each of the plurality of computer languages may be stored in memory 22. In one embodiment, the infrastructure code may be messaging system interface code to facilitate transmission of the information described by the sematic data model via a communication infrastructure, e.g., a messaging system, utilizing a respective computer language. The infrastructure code may therefore be configured to interact with a messaging system in this embodiment utilizing the respective computer language. In another embodiment, the infrastructure code may be database interface code to cause the information described by the semantic data model to persist within and to be retrieved from a data persistence infrastructure, such as a database system, utilizing a respective computer language. Thus, the infrastructure code may be configured to interact with a database system in this embodiment utilizing the respective computer language. By automatically generating the infrastructure code in each of a plurality of computer languages, the SDD generator 12 may provide flexibility in regards to the communication infrastructure and/or data persistence infrastructure that may interact with the information described by a semantic data model since the communication infrastructure and/or the data persistence infrastructure may utilize any of the plurality of computer languages for which infrastructure code is automatically generated without having to invest the time and expense required to generate additional infrastructure code.

By way of further explanation, reference is now made to FIG. 3 in which the SDD generator 12 of one embodiment is depicted and hereinafter described. As shown, the SDD generator 12 may include an ontology parser 42 for receiving the ontology 40 representative of the semantic data model. The ontology parser 42 processes the semantic data model and creates an internal representation of the classes, e.g., objects, that are included within the semantic data model.

The parser 42 of one embodiment uses a recursive algorithm to read the XML markup in the semantic model. As the parser 42 encounters classes within classes, classes with attributes, classes that are enumerations, or classes that themselves contain enumerations, the parser of this embodiment constructs an in-memory associative array that maintains the structure of the relationship among the classes, enumerations, attributes, and any other ontological elements. While an in-memory associative array may be employed as noted above, the relationship between the ontological elements may be stored in other manners. Once resident in memory, however, the internal class definitions can be accessed by one or many code translators 46 to generate the protocol that are saved in memory 22. The internal class definitions 44 of one embodiment are manifested as Java classes. The Java classes of this embodiment are populated with information from the model and then linked in an associative array for further processing by a code translator 46. A source code fragment of one of the Java classes that may make up an internal class definition 44 follows:

```
public class OwlClassInfo {
    private String name;
    private String comment;
    private List<PropertyInfo>propertyInfoList;
    private List<EnumInfo>enuminfoList;
    private List<OwlClassInfo>superClassList;
}
```

In this manner, the model is read into processor memory and arranged in a way that makes it easy for a variety of different translators 46 to work with the model without having to understand OWL or XML as the details of OWL and XML are abstracted away.

The code form of the internal class definitions 44 is fixed in one embodiment, but the member variables in the class (shown above as name,comment,propertyInfoListenumInfoList, etc.) are set from information contained in the ontology 40, and then linked in an associative array based on their relationship in the ontology 40.

In this embodiment, the mapping information is used only by code translators 46, not by the ontology parser 42. The code translators 46 of this embodiment are plug-ins to the SDD generator 12, and access the internal class definitions 44 through a well-defined process.

As such, the ontology parser 42 generates internal class definitions 44 that includes information or otherwise represents the different classes that are included within the semantic data model. The internal class definitions 44 are language neutral class definition, that is, the class definitions are not specific to any particular computer language but are, instead, applicable or generic to each of the plurality of computer languages. The internal class definitions 44, in combination with the rules of the semantic data model, allow for the generation of software to translate between different versions of the semantic data model.

In order to generate code that translates between different versions of a data model the SDD generator 12 may use a second instance of the ontology parser 42. The second instance of the ontology parser 42 of this embodiment would create a second instance of the internal class definitions 44 that represent a different version of the ontology. The SDD generator 12 of this embodiment may include a rules parser 50 that would ingest the rules and create internal rule definitions 52. An additional code translator 46 could then work with the two distinct internal class definitions 44 to generate the software that translates messages or objects defined by one version of the ontology into messages or objects defined by a different version of the ontology. In this regard, the code translators 46 of this embodiment ingest the internal rule definitions, as these would be used when generating a translator. The generated software that makes up a translator would have a dependency on the software generated for each ontology. For example, the difference between two ontologies is described as follows:

Two different version of an ontology contain a concept called "Track". In the newer of the two versions, "Track" contains an attribute named "CallSign" that does not exist in the older version. Code translators 46 generate code for each ontology in a chosen computer language without consulting the rules 20. Next, a different code translator, one that knows how to parse the rules, generates protocol translation code. Assume that the rules state, "when no information is available for the field named CallSign it must be set to the string 'Unknown'". When the generated protocol translation code is used in a running computer program, that code will ensure, when it is provided an old version of a "Track" object, that objects created for the new version of the ontology will have the string "Unknown" in the "CallSign" field. The protocol translation code uses, or depends on, the code that was generated for the two ontologies.

A translator may be considered a specialization of, or the same as a protocol. Thus, the new code translator 46 reads the two internal class definitions 44 and the new internal rules definition 52 and generates a special case of a protocol that is actually a translator. In this embodiment, translator code is generated to and may be used, along with the generated code for each ontology version, by a user written application to translate between the different versions. The SDD generator 12 of this embodiment also includes one or more code translators 46. The code translators 46 receive ontology extensions 48 that provide additional features to the ontology. An ontology extension 48 is an XML file that contains extra information about the objects in an ontology. An embodiment of this additional information might be information that describes how an item in the ontology might be displayed in a graphical display. For example, the ontology may contain a class called "Track". One of the attributes of "Track" may be named "longitude". The ontology of this example contains no information about how "longitude" might be used—it only describe what "longitude" is. Information in the ontology extension might indicate that "longitude" must be displayed in a table, and that in the table, it appears next to the label "Lon". Ontology extensions allow for addition of supplemental information about an ontology without having to modify the ontology file, and are used solely by code translators 46 to generate additional code, separate from the infrastructure.

Information in an extension 48 is used only by code translators 46, and the resulting software generated from an extension has a dependency on the generated software for an ontology. This is similar in concept to how generated translation code has a dependency on the code generated for the classes in an ontology.

Additionally, the code translators 46 process the internal class definitions 44 representative of the different classes that are included within the semantic data model in order to generate infrastructure code in each of the plurality of computer languages. As described above, the code translators 46 use internal class definitions 44 and configuration files 16, e.g., templates, to construct the generated code. In this embodiment, internal class definitions 44 are organized as an associative array in processor memory based on the ontology 40. Code translators 46 "walk trough" or parse the internal class definitions and produce the generated infrastructure/protocol code.

As such, the code translators 46 and, more generally, the SDD generator 12 converts the language neutral class definitions provided by the internal class definitions 44 into language-specific class definitions that are utilized in regards to the generation of infrastructure code in each of the plurality of different computer languages. The resulting infrastructure code in each of the plurality of computer languages, also called protocols, may be stored in memory 22 associated and in communication with the SDD generator 12.

As described above, the SDD generator 12 may be embodied by a computing device. Thus, with respect to the embodiment of the SDD generator 12 of FIG. 3, the ontology parser 42, the rules parser 50 and the code translators 46 may be embodied by a processor of the computing device, while the internal class definitions 44 and the internal rule definitions 52 may be stored and, therefore, embodied by a memory device that is accessible to and in communication with the processor of the computing device. However, the SDD generator 12, such as the embodiment of the SDD generator depicted in FIG. 3, may be differently embodied in other embodiments.

With respect to the embodiment of FIG. 3, the SDD generator 12 may automatically generate the infrastructure code for each of a plurality of computer languages utilizing one or more code translators 46, each of which generates infrastructure code for a different respective computer language. Although infrastructure code may be generated for any number of computer languages, the SDD generator 12 of one embodiment may automatically generate infrastructure code for IDL, XML, Java messaging service (JMS), Hibernate/structured query language (SQL), enterprise service bus (ESB), Google web toolkit (GWT)/AJAX, Java tools such as Ant and Maven, etc. This infrastructure code may, in turn, be utilized in order to facilitate transmission via various messaging systems and/or database systems. In this regard, IDL infrastructure code may support operations of omniORB, OpenDDS, or any messaging system that adheres to the Real Time Publish Subscribe (RTPS) protocol, XML and JMS infrastructure code may support JBoss messaging systems, Hibernate/SQL infrastructure code may support MySQL database systems, ESB infrastructure code may support JBoss ESB systems and GWT/AJAX infrastructure code may support Firefox or other browser-based systems.

Thus, the method, apparatus and computer program product of an example embodiment may automatically generate infrastructure code for each of a plurality of computer languages in an efficient manner, thereby providing substantial flexibility in regards to the messaging infrastructure and/or data persistence infrastructure with which the information described by a semantic data model may be utilized. As a result of the automatic generation of the infrastructure code, the infrastructure code may also be regenerated in an efficient manner in instances in which the semantic data model changes such as a result of product development, a change in a published standard or other reasons. Additionally, the method, apparatus and computer program product of an example embodiment avoids the use of multiple tools and, as such, eliminates any need to understand the individual processes of the other tools and the interim formats that are generated as the data is transformed. Instead, the method, apparatus and computer program product of an example embodiment provide a plug-in architecture that allows for the capabilities to be readily expanded by adding one or more additional code translators 46 to leverage the language-neutral data model so as to generate infrastructure code in additional computer languages without requiring the use of multiple tools or the need to understand and work with interim formats.

FIG. 2 is a block diagram of an example system, method and/or computer program product according to an example embodiment. It will be understood that each block and/or combinations of blocks in the block diagrams, can be implemented by various means. Means for implementing the blocks of the block diagram, combinations of the blocks in the block diagram, or other functionality of example embodiments described herein may include hardware, and/or a computer program product including a non-transitory computer-readable storage medium (as opposed to a computer-readable transmission medium which describes a propagating signal) having one or more computer program code instructions, program instructions or executable computer-readable program code instructions stored therein. In this regard, program code instructions for carrying out the operations and functions of the blocks of FIG. 2 and otherwise described herein may be stored in a memory device of an example apparatus, and executed by a processor. As will be appreciated, any such program code instructions may be loaded onto a computer or other programmable apparatus (e.g., processor, memory device or the like) from a computer-readable storage medium to produce a particular machine, such that the particular machine becomes a means for implementing the functions specified in the blocks of the block diagram.

These program code instructions may also be stored in a non-transitory computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the block diagrams' modules or blocks. The program code instructions may be retrieved from a computer-readable storage medium and loaded into a computer, processor or other programmable apparatus to configure the computer, processor or other programmable apparatus to execute operations to be performed on or by the computer, processor or other programmable apparatus. Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded and/or executed together. Execution of the program code instructions may produce a computer-implemented process such that the instructions executed by the computer, processor or other programmable apparatus provide operations for implementing the functions specified in the blocks of the block diagram.

Accordingly, execution of instructions associated with the blocks of the block diagram by a processor, or storage of instructions associated with the blocks of the block diagram in a computer-readable storage medium, supports combinations of operations for performing the specified functions. It will also be understood that one or more blocks of the block diagram, and combinations of blocks in the block diagram, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method for generating infrastructure code, the method comprising:
   receiving an ontology representative of a semantic data model;
   processing, with a processor, the ontology in accordance with configuration information that defines the portion of the ontology to process, mapping information that defines a relationship between type information in the semantic data model and data types in the infrastructure code and one or more rules from the semantic data model relating to conversion between different versions of semantic data model; and
   in response to the processing, automatically generating the infrastructure code in each of a plurality of computer languages; and
   wherein processing the ontology comprises creating a representation of language neutral classes within the semantic data model.

2. A method according to claim 1 wherein the semantic data model describes information, and wherein the infrastructure code is configured to facilitate transmission of the information via a communication infrastructure utilizing a respective computer language.

3. A method according to claim 2 wherein the infrastructure code is configured to interact with a messaging system utilizing the respective computer language.

4. A method according to claim 1 wherein the semantic data model describes information, and wherein the infrastructure code is configured to cause the information to persist within a data persistence infrastructure and to be retrieved from the data persistence infrastructure utilizing a respective computer language.

5. A method according to claim 1 wherein automatically generating the infrastructure code comprises converting the language neutral classes to language specific classes for each of the plurality of computer languages for which infrastructure code is generated.

6. A system for generating infrastructure code, the system comprising:
   a semantic driven development (SDD) generator configured to receive an ontology representative of a semantic data model, the SDD generator also configured to process the ontology in accordance with configuration information that defines the portion of the ontology to process, mapping information that defines a relationship between type information in the semantic data model and data types in the infrastructure code and one or more rules from the semantic data model relating to conversion between different versions of semantic data model, the SDD generator further configured to automatically generate the infrastructure code in each of a plurality of computer languages in response to the processing; and
   a memory configured to store the infrastructure code generated in each of the plurality of computer languages; and
   wherein the SDD generator is configured to process the ontology by creating a representation of language neutral classes within the semantic data model.

7. A system according to claim 6 wherein the semantic data model describes information, and wherein the infrastructure code is configured to facilitate transmission of the information via a communication infrastructure utilizing a respective computer language.

8. A system according to claim 6 wherein the semantic data model describes information, and wherein the infrastructure code is configured to cause the information to persist within a data persistence infrastructure and to be retrieved from the data persistence infrastructure utilizing a respective computer language.

9. A system according to claim 8 wherein the infrastructure code is configured to interact with a database system utilizing the respective computer language.

10. A system according to claim 6 wherein the SDD generator is configured to automatically generate the infrastructure code by converting the language neutral classes to language specific classes for each of the plurality of computer languages for which infrastructure code is generated.

11. A computer program product for generating infrastructure code, the computer program product comprising a non-transitory computer-readable storage medium having computer-readable program code portions stored therein that in response to execution by a processor cause an apparatus to:
   receive an ontology representative of a semantic data model;
   process the ontology in accordance with configuration information that defines the portion of the ontology to process, mapping information that defines a relationship between type information in the semantic data model and data types in the infrastructure code and one or more rules from the semantic data model relating to conversion between different versions of semantic data model; and
   in response to the processing, automatically generate the infrastructure code in each of a plurality of computer languages; and
   wherein the computer-readable program code portions are configured to process the ontology by creating a representation of language neutral classes within the semantic data model.

12. A computer program product according to claim 11 wherein the semantic data model describes information, and wherein the infrastructure code is configured to facilitate transmission of the information via a communication infrastructure utilizing a respective computer language.

13. A computer program product according to claim 12 wherein the infrastructure code is configured to interact with a messaging system utilizing the respective computer language.

14. A computer program product according to claim 11 wherein the semantic data model describes information, and wherein the infrastructure code is configured to cause the information to persist within a data persistence infrastructure and to be retrieved from the data persistence infrastructure utilizing a respective computer language.

\* \* \* \* \*